(12) United States Patent
Hu et al.

(10) Patent No.: US 11,097,749 B2
(45) Date of Patent: Aug. 24, 2021

(54) MULTIMODAL TRANSPORTATION INTERWORKING SYSTEM

(71) Applicant: CRRC YANGTZE CO., LTD., Wuhan (CN)

(72) Inventors: Haiping Hu, Wuhan (CN); Lijie Su, Wuhan (CN); Lei Zhang, Wuhan (CN); Tao Liu, Wuhan (CN); Haibin Hu, Wuhan (CN); Fengwei Liu, Wuhan (CN); Chuqiang Tang, Wuhan (CN); Baolei Wang, Wuhan (CN); Yueming Hu, Wuhan (CN); Yunqing Zuo, Wuhan (CN); Junqin Zhu, Wuhan (CN)

( * ) Notice: Subject to any disclaimer, the term of this patent is extended or adjusted under 35 U.S.C. 154(b) by 270 days.

(21) Appl. No.: 16/343,795

(22) PCT Filed: Jul. 25, 2017

(86) PCT No.: PCT/CN2017/094307
§ 371 (c)(1),
(2) Date: Apr. 22, 2019

(87) PCT Pub. No.: WO2018/076834
PCT Pub. Date: May 3, 2018

(65) Prior Publication Data
US 2019/0251510 A1 Aug. 15, 2019

(30) Foreign Application Priority Data

Oct. 24, 2016 (CN) .......................... 201610937619.4
Oct. 24, 2016 (CN) .......................... 201621160102.0

(51) Int. Cl.
*B61B 3/00* (2006.01)
*B65G 67/02* (2006.01)
(Continued)

(52) U.S. Cl.
CPC ................ *B61B 3/00* (2013.01); *B61B 13/06* (2013.01); *B61D 47/00* (2013.01); *B65G 63/00* (2013.01); *B65G 63/04* (2013.01); *B65G 67/02* (2013.01)

(58) Field of Classification Search
CPC .. B61B 3/00; B61B 3/06; B65G 63/00; B65G 63/045; B65G 67/02
See application file for complete search history.

(56) References Cited

U.S. PATENT DOCUMENTS 8,746,153 B2 * 6/2014 Barry .................... B61D 47/00
105/355
10,611,583 B2 * 4/2020 Su ........................ B65G 63/045
(Continued)

FOREIGN PATENT DOCUMENTS

CN 2012965509 Y 8/2009
CN 106516779 A 3/2017
(Continued)

OTHER PUBLICATIONS

Office action of CN201610937619.4.
International search report of PCT/CN2017/094307.

*Primary Examiner* — Kaitlin S Joerger
(74) *Attorney, Agent, or Firm* — ZANIP

(57) ABSTRACT

A multimodal transportation interworking system at least comprises: a rail system; a cargo vehicle (31), which may be movably disposed on a rail beam of the rail system (30); a transfer apparatus (32), for transferring a goods loading device (33) from a transportation tool to the cargo vehicle (31) and loading onto the cargo vehicle, or unloading the goods loading device (33) from the cargo vehicle and conveying the same onto the transportation tool; a processor, which is connected to the cargo moving device (31) and the transfer apparatus (32) so as to control the transfer apparatus to transfer the goods loading device, and after the goods (Continued)

loading device is secured onto the cargo vehicle, to control the cargo vehicle to move on the rail beam.

10 Claims, 12 Drawing Sheets

(51) Int. Cl.
*B65G 63/00* (2006.01)
*B65G 63/04* (2006.01)
*B61B 13/06* (2006.01)
*B61D 47/00* (2006.01)

(56) References Cited

U.S. PATENT DOCUMENTS

| | | |
|---|---|---|
| 2005/0158158 A1 | 7/2005 | Porta |
| 2014/0072398 A1 | 3/2014 | Lanigan, Sr. et al. |
| 2014/0182476 A1* | 7/2014 | Frost .................... B61B 3/00 |
| | | 104/93 |
| 2019/0241379 A1* | 8/2019 | Ruiz Vega .......... B65G 63/004 |
| 2019/0251510 A1* | 8/2019 | Hu ........................ B61B 13/06 |

FOREIGN PATENT DOCUMENTS

| | | |
|---|---|---|
| CN | 206486008 U | 9/2017 |
| DE | 4332232 C1 | 2/1995 |
| DE | 29922538 U1 | 5/2001 |
| EP | 0831002 A1 | 3/1998 |
| WO | 97007007 A1 | 2/1997 |
| WO | 1997009260 A1 | 3/1997 |

\* cited by examiner

MULTIMODAL TRANSPORTATION INTERWORKING SYSTEM

TECHNICAL FIELD

The embodiments of the present invention relate to the technical field of logistics, and in particular to a multimodal transportation interworking system.

BACKGROUND OF THE INVENTION

In modern logistics development, how to improve the transportation efficiency and reduce the logistics costs has become an important issue. Multimodal transportation, as a high-efficiency mode of transportation, represents the development direction of the logistics industry. In China's Medium- and Long-Term Development Plan for Logistics Industry (2014-2020), it has been stressed 18 times to greatly develop multimodal transportation, and multimodal transportation is placed at the strategic level in development of the logistics industry. In addition, the 13$^{th}$ Five-Year Development Plan of China's Ministry of Transport has explicitly put forward a development goal of "seamless connection" of cargo transportation; under this Plan, multimodal transport equipment will be developed greatly, efforts should be made to build a multimodal transportation organization system in which facilities are connected efficiently, hubs transfer rapidly, information is interconnected and shared, equipment is standard and professional and services are integrally matched, and priority should be given to the development of a multimodal transportation system which takes goods loading devices and semitrailers as standard carrier units.

Goods loading device multimodal transportation, as an advanced mode of transportation, has become a significant symbol of modern international cargo transportation. So far multiple modes of transportation, such as road, railway, water transportation and civil aviation in our country have achieved a huge scale, whereas these modes of transportation develop in a scattered way and fail to be linked in harmony. Road goods loading device transportation trucks (hereinafter abbreviated as road container trucks) are the only shuttle tool for effecting goods loading device drayage between ports and railway, air logistics centers. This single mode of transportation is inefficient and causes big pressure and environmental pollution to the ground transportation. As a result, the national comprehensive multimodal transportation develops slowly, and the development of the national comprehensive transportation system is affected.

Therefore, "to accelerate the multimodal transportation facility construction, build collection and distribution channels with matched capabilities, provide modern transit facilities and establish a multimodal transportation information platform" has become important issues for our country to establish a multimodal transportation system.

SUMMARY OF THE INVENTION

By providing a multimodal transportation interworking system, the present disclosure achieves technical effects of multimodal transportation between ports and railway, air logistics centers.

The present invention provides a multimodal transportation interworking system, and the system at least comprises:
a rail system;
a cargo vehicle movably disposed on a rail beam of the rail system;
a transfer apparatus used for transferring a goods loading device from a transportation tool onto the cargo vehicle and loading the goods loading device onto the cargo vehicle, or unloading the goods loading device from the cargo vehicle and conveying the goods loading device onto the transportation tool;
a processor connected to the cargo vehicle and the transfer apparatus so as to control the transfer apparatus to transfer the goods loading device, and to control the cargo vehicle to move on the rail beam after the goods loading device is secured onto the cargo vehicle;
and wherein, as the goods loading device needs to be transferred, the transfer apparatus transfers the goods loading device from the transportation tool to the cargo vehicle and loads the goods loading device onto the cargo vehicle, and the processor controls the cargo vehicle to move on the rail beam, or the transfer apparatus unloads the goods loading device from the cargo vehicle and conveys the goods loading device onto the transportation tool.

Further, the rail system is bilaterally symmetrically mounted with two rail beams, and the two rail beams are respectively provided with a plurality of cargo vehicles which are movable thereon, and the goods loading device is suspended on a lower end of the plurality of cargo vehicles below the rail beam at each side.

Further, the rail beams are of a box-type structure, and a lower surface of the rail beams is provided with an opening which extends through from a front end to a rear end thereof, and the cargo vehicle is supported at a lower surface of an inner cavity of the rail beams.

Further, each of the cargo vehicles comprises a cargo vehicle bogie being supported at the lower surface of the inner cavity of the rail beams. The cargo vehicle bogie comprises a bogie frame whose front and rear ends are connected with gearboxes respectively, and each of the gearboxes is symmetrically provided with two output shafts on left and right sides. A travelling wheel is mounted on each of the output shafts, and the cargo vehicle bogie runs on the rail beams by four travelling wheels. Front and rear ends of two gearboxes are connected to two frame intermediate connections respectively, and front and rear ends of the two frame intermediate connections are respectively connected to two traction electric motors which control the cargo vehicle bogie to run. A lower end of the cargo vehicle bogie is connected to a goods loading device integrated spreader via a suspension device after passing through the opening, and a lower end of the goods loading device integrated spreader is connected to the goods loading device. The processor is connected to the traction electric motor.

Further, a left side and a right side of a housing of each of the traction electric motors are symmetrically connected with two guide wheel mounting seats on a lower portion thereof, and guide wheels are mounted on the two guide wheel mounting seats respectively. Guide rails are provided on left and right side walls of the opening of the rail beams respectively, and the two guide wheels move along the two guide rails respectively.

Further, the suspension device comprises a center pin. An upper end of the center pin is connected to a lower end of the bogie frame, and a lower end of the center pin is connected with a connection seat which is connected to two suspension arms via multiple first spindles. Lower ends of the two suspension arms are connected to a mounting seat via multiple second spindles, and the mounting seat is connected to the goods loading device integrated spreader.

Further, the transfer apparatus at least comprises: a conveyance mechanism, a grab mechanism and a lift mechanism; the grab mechanism places the goods loading device on the conveyance mechanism; the conveyance mechanism transports the goods loading device to the lift mechanism; the lift mechanism lifts or lowers the goods loading device; the goods loading device is loaded onto or unloaded from the cargo vehicle; and the processor is communicatively connected to the conveyance mechanism, the grab mechanism and the lift mechanism.

Further, the conveyance mechanism at least comprises: a first frame, a chain, a first group of rotation shafts and a power outputting device; the first group of rotation shafts is disposed on the first frame; each rotation shaft of the first group of rotation shafts is provided with gears; the chain is fitted around the gears to drive each rotation shaft of the first group of rotation shafts to rotate; and a power output end of the power outputting device is connected to the chain.

Further, the grab mechanism at least comprises: a telescopic arm, a first support rod, a second support rod, a first telescopic rod, a second telescopic rod, a third telescopic rod and a spreader, a first end of the first support rod is fixedly connected to the first frame, and a second end of the first support rod is hinged to a first end of the second support rod; a second end of the second support rod is hinged to the telescopic arm; a first end of the first telescopic rod is fixedly connected to the first frame, and a second end of the first telescopic rod is hinged to the second support rod, a first end of the second telescopic rod is hinged to the first end of the second support rod, and a second end of the second telescopic rod is hinged to a first end of the telescopic arm; a first end of the third telescopic rod is fixedly connected to the first end of the telescopic arm, and a second end of the third telescopic rod is fixedly connected to a second end of the telescopic arm; the second end of the telescopic arm is connected to the spreader.

Further, the transfer apparatus comprises: an underframe, a lifting device, a lifting table, a lift driving device, a plurality of travel wheels and a travel driving device;

the lifting device is connected between the underframe and the lifting table;

the lift driving device is connected to the lifting device for driving the lifting device to lift or lower the lifting table;

the plurality of travel wheels are fixed under the underframe;

the travel driving device is fixed onto the underframe and connected to the travel wheels for driving a rotation of the travel wheels;

the processor is communicatively connected to the lift driving device and the travel driving device.

One or more technical solutions in accordance with the present invention at least have the following technical effects or advantages:

by a rail system connecting various ports with railway and air logistics centers, and a processor controlling a transfer apparatus to transfer a goods loading device and controlling a cargo vehicle to move on the rail system after the goods loading device is secured on the cargo vehicle, multimodal transportation between ports and railway, air logistics centers is achieved. In addition, by replacing road goods loading device transportation trucks with the rail system, not only the transport efficiency is increased, but also the pressure on the ground transportation is reduced and the environment is also protected.

DETAILED DESCRIPTION OF THE INVENTION

A multimodal transportation interworking system in accordance with embodiments of the present invention can achieve such technical effect as multimodal transportation between ports and railways, air logistics centers.

To solve the foregoing technical problem, a technical solution according to embodiments of the present invention follows a general idea as below:

a rail system is provided to connect various ports with railways, air logistics centers, and a processor is provided to control a transfer apparatus to transfer a goods loading device and control a cargo vehicle to move on a rail beam after the goods loading device is secured onto the cargo vehicle. In this way, multimodal transportation between ports and railway, air logistics centers is achieved. In addition, by replacing road goods loading device transportation trucks with the rail system, not only the transport efficiency is increased, but also the pressure on the ground transportation is reduced and the environment is also protected.

To better understand the foregoing technical solution, detailed illustration is presented to the above technical solution in conjunction with the accompanying drawings and specific embodiments.

Figure 1:
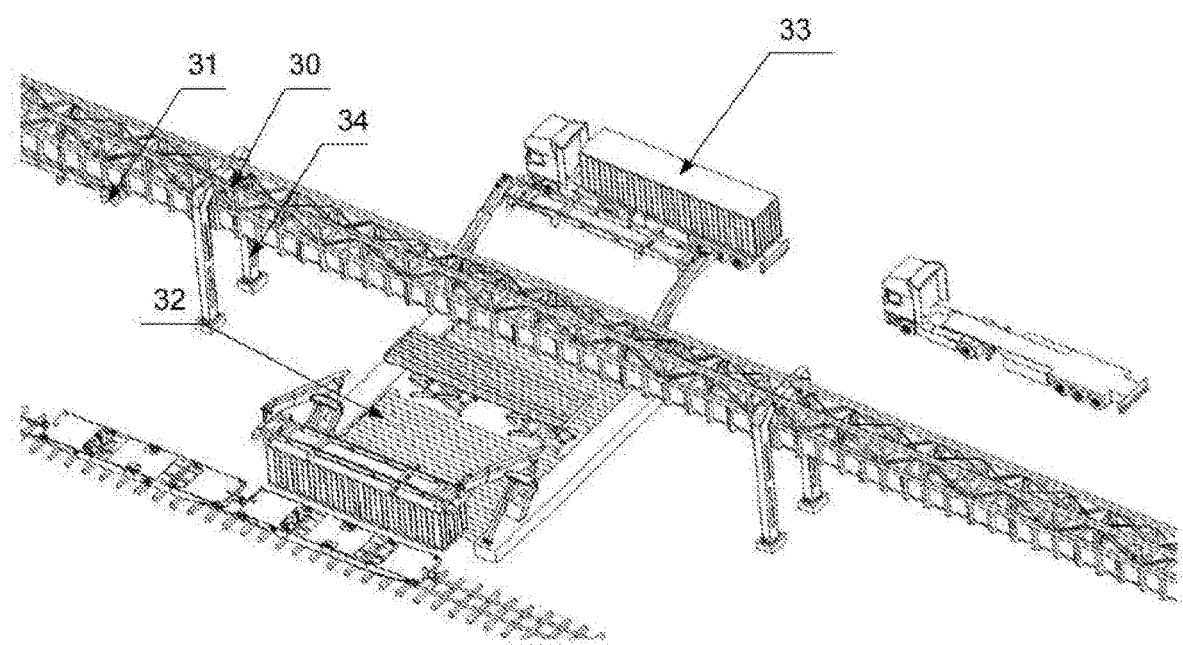
FIG. 1 shows a schematic structural view of a multimodal transportation interworking system in accordance with embodiments of the present invention.

With reference to FIG. 1, a multimodal transportation interworking system is provided according to embodiments of the present invention, at least comprising:

a rail system 30;

a cargo vehicle 31 disposed movably on a rail beam of the rail system 30;

a transfer apparatus 32 used for transferring a goods loading device 33 from a transportation tool to the cargo vehicle 31 and loading the same onto the cargo vehicle 31, or unloading the goods loading device 33 from the cargo vehicle 31 and conveying the same onto the transportation tool;

a processor, which is connected to the cargo vehicle 31 and the transfer apparatus 32 so as to control the transfer apparatus 32 to transfer the goods loading device 33, and to control the cargo vehicle 31 to move on the rail beams after the goods loading device 33 is secured onto the cargo vehicle 31.

In some embodiments, as the goods loading device 33 needs to be transferred, the transfer apparatus 32 transfers the goods loading device 33 from a transportation tool to the cargo vehicle 31 and loads the same onto the cargo vehicle 31, and the processor controls the cargo vehicle 31 to move on the rail beams, or the transfer apparatus 32 unloads the goods loading device 33 from the cargo vehicle 31 and conveys the same onto the transportation tool.

Figure 2:
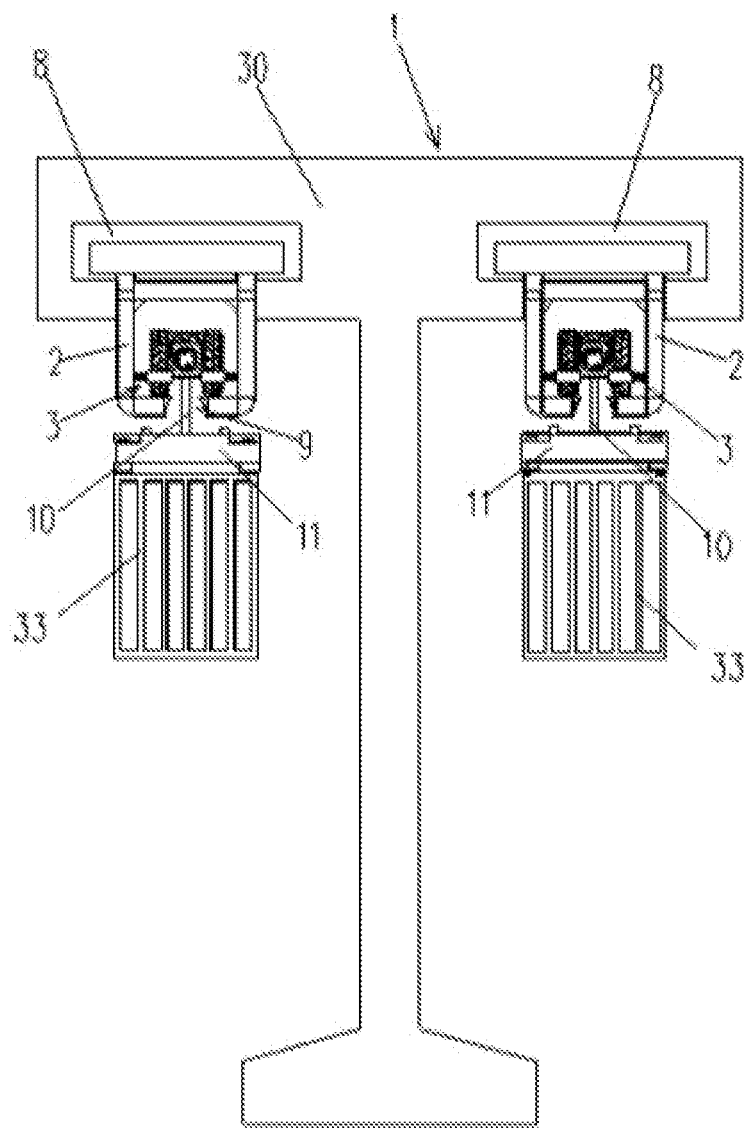
FIG. 2 shows a schematic structural view of a first embodiment of a rail system in a multimodal transportation interworking system in accordance with embodiments of the present invention.
Figure 3:
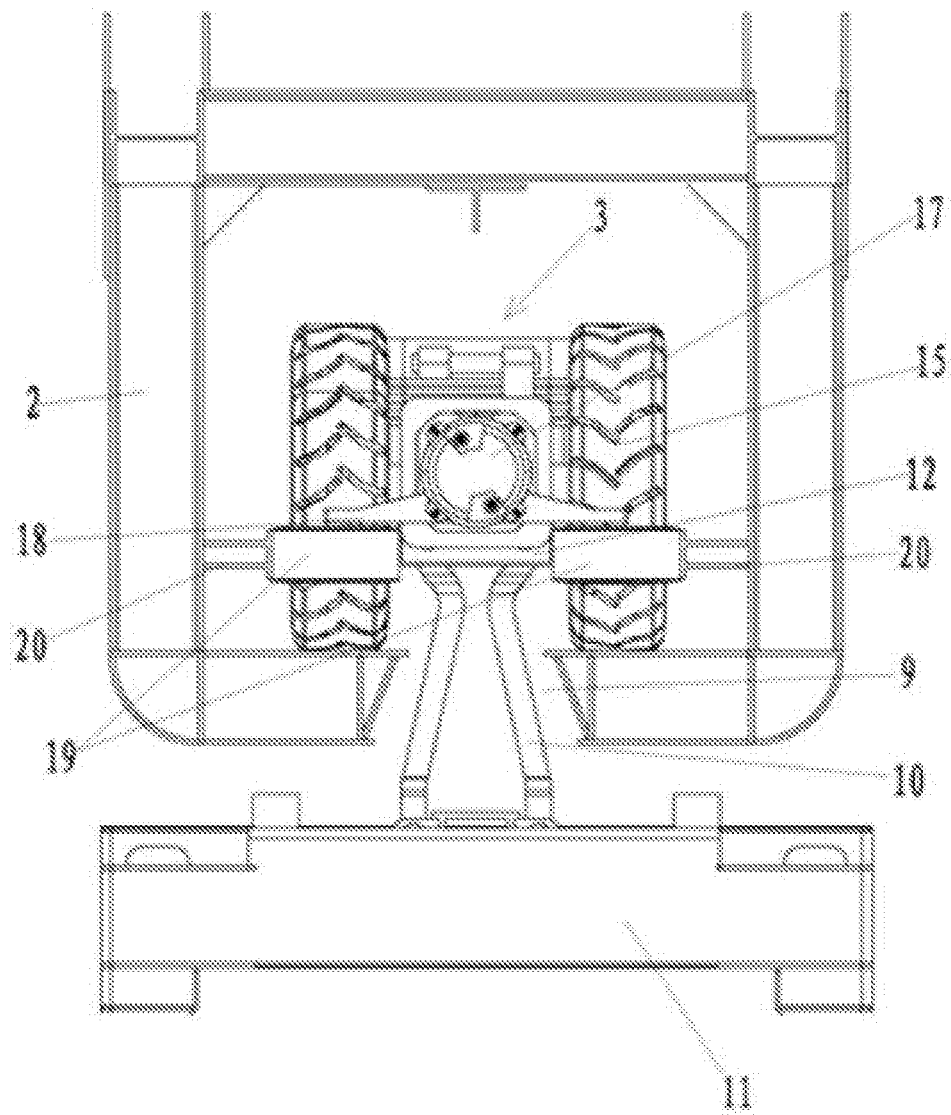
FIG. 3 shows a schematic structural view of a cargo vehicle bogie and a rail beam in FIG. 2.
Figure 4:
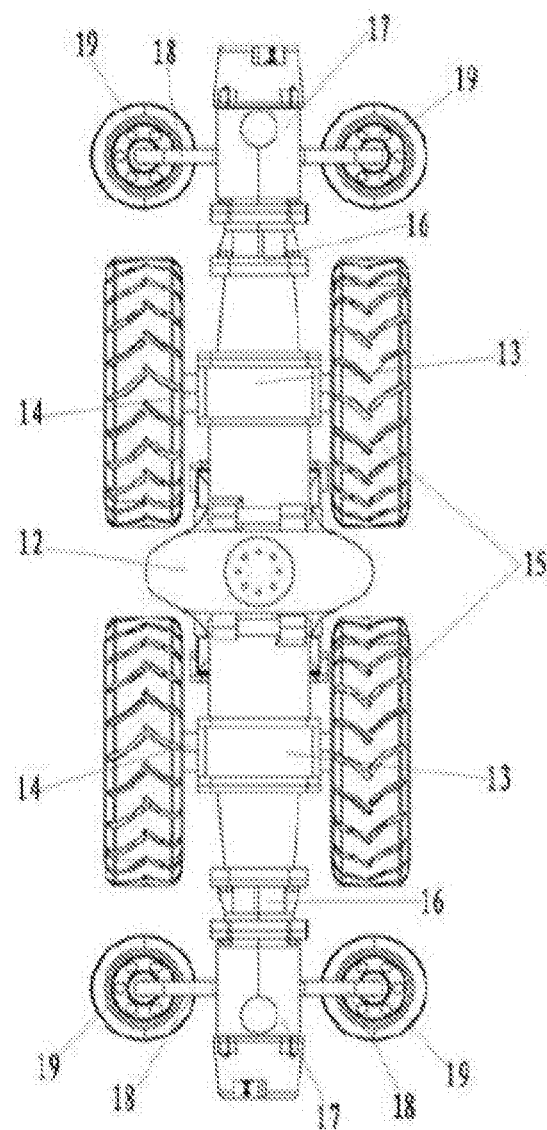
FIG. 4 shows a schematic top structural view of a cargo vehicle bogie in FIG. 2.
Figure 5:
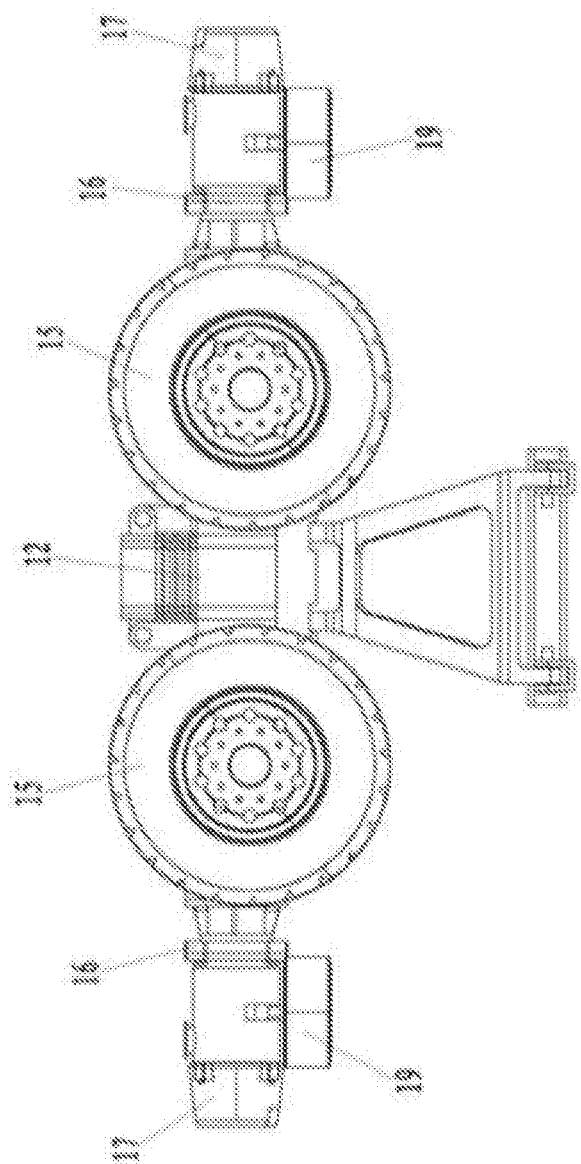
FIG. 5 shows a schematic right structural view of a cargo vehicle bogie in FIG. 2.

With reference to FIGS. 2 and 3, a structure according to a first embodiment of the present invention comprises a rail system 1 comprising a rail pillar 30 and two rail beams 2. A lower surface of an upper portion of the rail pillar 30 is bilaterally symmetrically provided with two C-shaped rail grooves 8, and the two rail grooves 8 run through from a front end to a rear end of the rail system 1. Two rail beams 2 are mounted within the two rail grooves 8. The rail system 1 may be conveniently and stably disposed in isolation strips. In this embodiment, the rail beams 2 are of a thin-walled steel box-type structure, and a lower surface of the rail beams 2 is provided with an opening 9 extending through from a front end to rear end thereof. Inner cavities of the two rail beams 2 are provided with multiple cargo vehicles 31 that are movable within the rail beams 2. In this embodiment, the inner cavity of each of the rail beams 2 is provided with two cargo vehicles 31 which are supported on a lower surface of the inner cavity of the rail beam 2. A lower end of the cargo vehicle 31 is connected with a goods loading device, which is the goods loading device 33 in this embodiment. With reference to FIGS. 4 and 5, the cargo vehicle 31 comprises a cargo vehicle bogie 3, a suspension device 10 connected under the cargo vehicle bogie 3, as well as a goods loading device integrated spreader 11 connected under the suspension device 10. A lower end of the goods loading device integrated spreader 11 is connected to the goods loading device 33. The present embodiment adopts a super-capacitor power supply mode. The cargo vehicle bogie 3 comprises a bogie frame 12 that is in a welded structure. A front end and a rear end of the bogie frame 12 are connected with two gearboxes 13 by welding, respectively, and each of the gearboxes 13 is symmetrically provided with two output shafts 14 on left and right sides thereof, and a travelling wheel 15 is mounted on each of the output shafts 14. The cargo vehicle bogie 3 runs on a lower surface of the inner cavity of the rail beam 2 by means of four travelling wheels 15. The front and rear ends of the two gearboxes 13 are connected to two frame intermediate connections 16 by bolts respectively, and the front and rear ends of the two frame intermediate connections 16 are connected by bolts with housings of two traction electric motors 17 that control the cargo vehicle bogie 3 to run. A left side and a right side of the housing of each of the traction electric motors 17 are symmetrically welded with two guide wheel mounting seats 18 on a lower portion thereof, and guide wheels 19 are mounted on the two guide wheel mounting seats 18 respectively. Guide rails 20 are provided on left and right side walls of the inner cavity of the rail beams 2 respectively, and the two guide wheels 19 move back and forth along the two guide rails 20, respectively. Each of the travelling wheels 15 and guide wheels 19 adopts rubber tires. A lower end of the bogie frame 12 is connected with the goods loading device integrated spreader 11 via the suspension device 10, and a lower end of the goods loading device integrated spreader 11 is connected to the goods loading device 33.

In use, the four cargo vehicle bogies 3 travel on the two rail beams 2, thereby driving the two goods loading devices 33 suspended under the four cargo vehicle bogies 3 to move along a direction of the rail beams 2. The transportation of the goods loading device 33 can be easily achieved through electric control. The four travelling wheels 15 of each cargo vehicle bogie 3 guarantees a steady travel on the rail beam 2, and the four guide wheels 19 of each cargo vehicle bogie 3 move back and forth along the guide rails 20 to effect the transportation of the goods loading device 33. The guide wheels 19 are provided to ensure that the cargo vehicle bogie 3 can steer steadily. All the travelling wheels 15 and the guide wheels 19 adopt rubber tires, so that an effect of shock absorption can be achieved when the cargo vehicle bogie 3 runs. At the same time, the adoption of rubber tires causes the vehicle have good acceleration and deceleration performance and stronger grade ability, reduces a noise of the vehicle and shock of the rail beams 2, and is more adaptive to ports with complex topography. The rail system 1 may be disposed in isolation strips, and multiple cargo vehicles 31 run on the two rail beams 2 in directions opposite to each other, respectively. Therefore, the air space is put into sufficient utilization, and no effect will be exerted on ground operations within the port, thus existing resources of docks can be utilized sufficiently for automation reformation, and problems such as dock congestion, lack of space and transport inefficiency can be solved. Thereby high-efficiency, low-cost and environment-friendly goods loading device quick and intelligent transport can be achieved, and meanwhile the transport system is simply structured, secure and reliable. Furthermore, the mounted rail beams 2 and the four cargo vehicle bogies 3 have a simple and compact structure without occupying extra space, and the structure of the rail beams 2 is also simple and makes it convenient for the cargo vehicle bogies 3 to move securely thereon. In this embodiment, the rail beam 2 may further be in a C-shaped channel steel structure, which also falls within the protection scope of the present invention.

Figure 6:
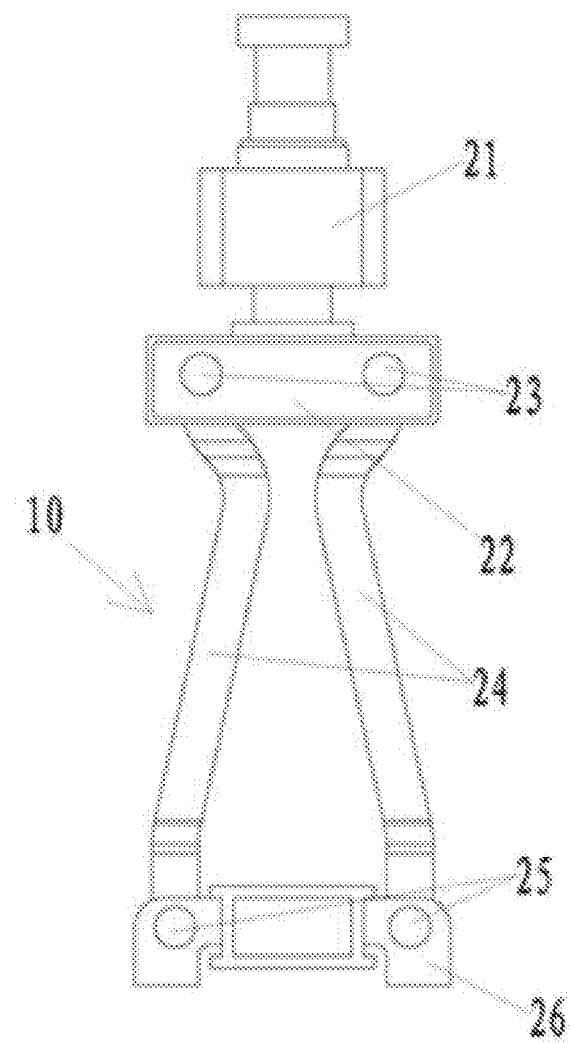
FIG. 6 shows a schematic front structural view of a suspension device of a second embodiment of a rail system in a multimodal transportation interworking system in accordance with embodiments of the present invention.
Figure 7:
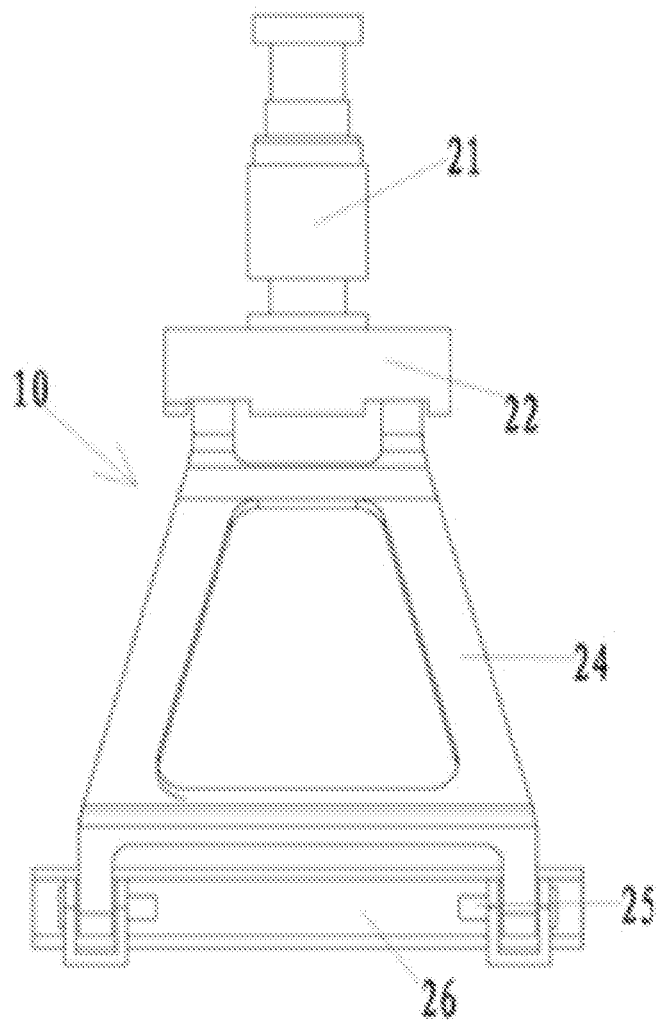
FIG. 7 shows a schematic right structural view of a suspension device of a second embodiment of a rail system in a multimodal transportation interworking system in accordance with embodiments of the present invention.

A structure according to a second embodiment of the present invention comprises a rail system 1 comprising a rail pillar 30 and two rail beams 2. A lower surface of an upper portion of the rail pillar 30 is bilaterally symmetrically provided with two C-shaped rail grooves 8, and the two rail grooves 8 run through from a front end to a rear end of the rail system 1. Two rail beams 2 are mounted within the two rail grooves 8. The rail system 1 may be conveniently and stably disposed in isolation strips. In this embodiment, the rail beams 2 are of a thin-walled steel box-type structure. A lower surface of the rail beams 2 is provided with an opening 9 extending through from a front end to a rear end thereof, and inner cavities of the two rail beams 2 are provided with multiple cargo vehicles 31 that are movable within the rail beams 2. In this embodiment, the inner cavity of each of the rail beams 2 is provided with two cargo vehicles 31 which are supported at a lower surface of the inner cavity of the rail beams 2. With reference to FIGS. 4 and 5, the cargo vehicle 31 comprises a cargo vehicle bogie 3, a suspension device 10 connected under the cargo vehicle bogie 3, as well as a goods loading device integrated spreader 11 connected under the suspension device 10. A lower end of the goods loading device integrated spreader 11 is connected with the goods loading device 33. The present embodiment adopts a super-capacitor power supply mode. The cargo vehicle bogie 3 comprises a bogie frame 12 that is in a welded structure. A front end and a rear end of the bogie frame 12 are connected with two gearboxes 13 by welding respectively, and each of the gearboxes 13 is symmetrically provided with two output shafts 14 on left and right sides thereof, and a travelling wheel 15 is mounted on each of the output shafts 14. The cargo vehicle bogie 3 runs on the lower surface of the inner cavity of the rail beam 2 by means of four travelling wheels 15. Front and rear ends of the two gearboxes 13 are connected to two frame intermediate connections 16 by bolts respectively, and the front and rear ends of the two frame intermediate connections 16 are connected by bolts with housings of two traction electric motors 17 that control the cargo vehicle bogie 3 to run. A left side and a right side of the housing of each of the traction electric motors 17 are symmetrically welded with two guide wheel mounting seats 18 on a lower portion thereof, and guide wheels 19 are mounted on the two guide wheel mounting seats 18 respectively. Guide rails 20 are provided on left and right side walls of the inner cavity of the rail beams 2 respectively, and the two guide wheels 19 move back and forth along the two guide rails 20, respectively. Each of the travelling wheels 15 and guide wheels 19 adopts rubber tires. A lower end of the bogie frame 12 is connected to the goods loading device integrated spreader 11 via the suspension device 10 after passing through an opening 9, and a lower end of the goods loading device integrated spreader 11 is connected to the goods loading device 33. With reference to FIGS. 6 and 7, the suspension device 10 comprises a center pin 21 via which the suspension device 10 is connected to a lower end of the bogie frame 12. A lower end of the center pin 21 is connected with a connection seat 22 which is connected to two suspension arms 24 via two first spindles 23, and the suspension arm 24 is of a bending plate body. Lower ends of the two suspension arms 24 are connected to a mounting seat 26 via two second spindles 25, and the mounting seat 26 is connected to the goods loading device integrated spreader 11. The processor is in a signal communication with the traction electric motor 17 to control a start or stop of the traction electric motor 17.

A working process and functions of the present embodiment is substantially same as those of the first embodiment, and thereby is not detailed here. In the present embodiment, by providing the suspension device 10 as the foregoing structure, a force transmission by the cargo vehicle bogie 3 in three directions as X axis, Y axis and Z axis is achieved, and meanwhile, a relative movement between the goods loading device 33 and the cargo vehicle bogie 3 is satisfied.

Figure 8:
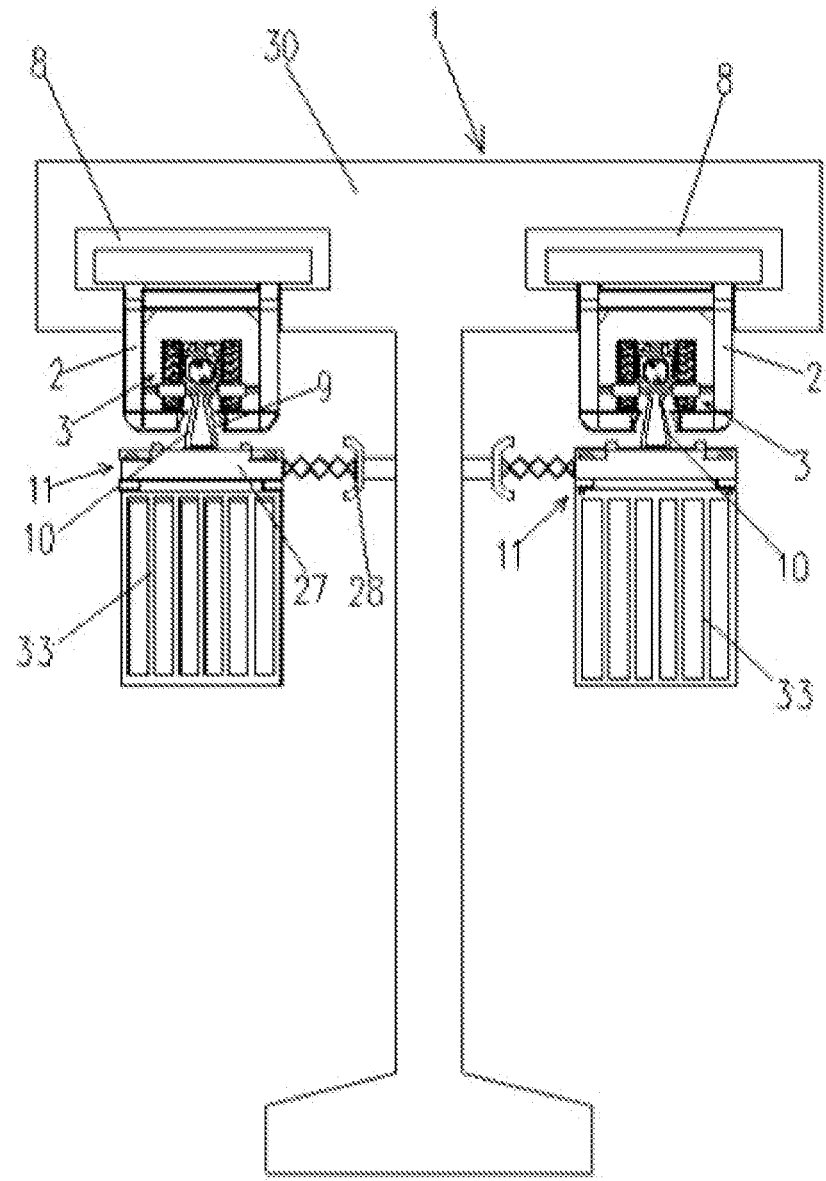
FIG. 8 shows a schematic front structural view of a third embodiment of a rail system in a multimodal transportation interworking system in accordance with embodiments of the present invention.
Figure 9:
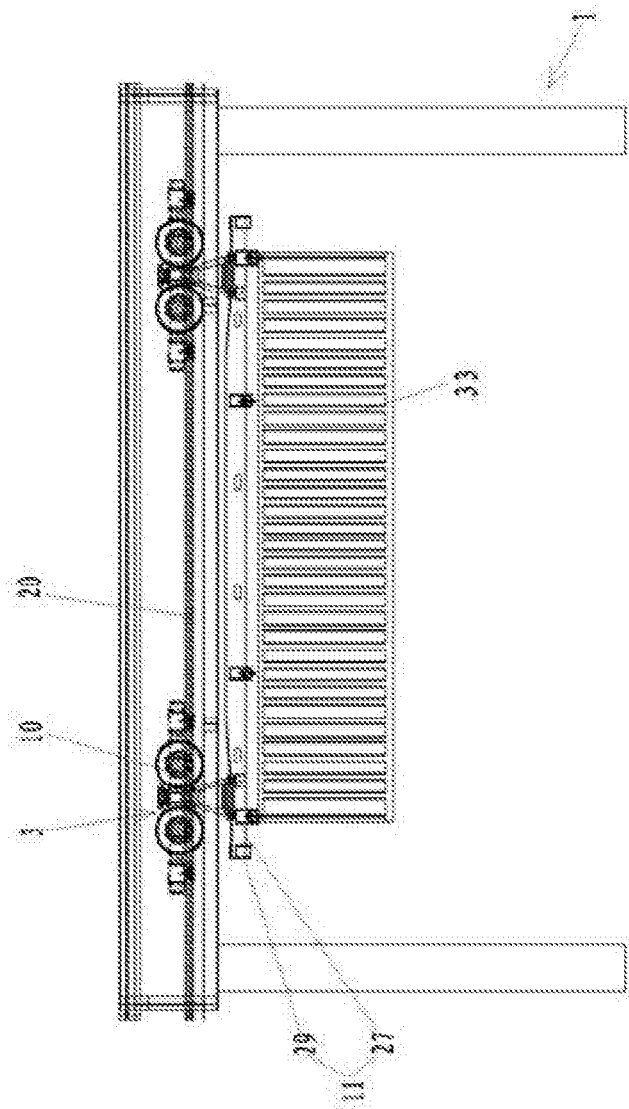
FIG. 9 shows a schematic right structural view of a third embodiment of a rail system in a multimodal transportation interworking system in accordance with embodiments of the present invention.

As shown in FIGS. 7 and 8 which are a schematic front structural view and a schematic right structural view of a third embodiment of the present invention respectively. As depicted, the structure according to the third embodiment comprises a rail system 1 comprising a rail pillar 30 and two rail beams 2. A lower surface of an upper portion of the rail pillar 30 is bilaterally symmetrically provided with two C-shaped rail grooves 8, and the two rail grooves 8 run through from a front end to a rear end of the rail system 1. Two rail beams 2 are mounted within the two rail grooves 8. The rail system 1 may be conveniently and stably disposed in isolation strips. In this embodiment, the rail beams 2 are of a thin-walled steel box-type structure, and a lower surface of the rail beams 2 is provided with an opening 9 extending through from a front end to rear end thereof. Inner cavities of the two rail beams 2 are provided with multiple cargo vehicles 31 that are movable within the rail beams 2. In this embodiment, the inner cavity of each of the rail beams 2 is provided with two cargo vehicles 31 which are supported at a lower surface of the inner cavity of the rail beam 2. With reference to FIGS. 4 and 5, the cargo vehicle 31 comprises a cargo vehicle bogie 3, a suspension device 10 connected under the cargo vehicle bogie 3, as well as a goods loading device integrated spreader 11 connected under the suspension device 10. A lower end of the goods loading device integrated spreader 11 is connected to the goods loading device 33. The cargo vehicle bogie 3 comprises a bogie frame 12 that is in a welded structure. A front end and a rear end of the bogie frame 12 are connected with two gearboxes 13 by welding, respectively, and each of the gearboxes 13 is symmetrically provided with two output shafts 14 on left and right sides thereof, and a travelling wheel 15 is mounted on each of the output shafts 14. The cargo vehicle bogie 3 runs on a lower surface of the inner cavity of the rail beam 2 by means of four travelling wheels 15. The front and rear ends of the two gearboxes 13 are connected to two frame intermediate connections 16 by bolts respectively, and the front and rear ends of the two frame intermediate connections 16 are connected by bolts with housings of two traction electric motors 17 that control the cargo vehicle bogie 3 to run. A left side and a right side of the housing of each of the traction electric motors 17 are symmetrically welded with two guide wheel mounting seats 18 on a lower portion thereof, and guide wheels 19 are mounted on the two guide wheel mounting seats 18 respectively. Guide rails 20 are provided on left and right side walls of the inner cavity of the rail beams 2 respectively, and the two guide wheels 19 move back and forth along the two guide rails 20, respectively. Each of the travelling wheels 15 and guide wheels 19 adopts rubber tires. A lower end of the cargo vehicle bogie 3 is connected to the goods loading device integrated spreader 11 via the suspension device 10 after passing through an opening 9, and a lower end of the goods loading device integrated spreader 11 is connected to the goods loading device 33. With reference to FIGS. 5 and 6, the suspension device 10 comprises a center pin 21 via which the suspension device 10 is connected to a lower end of the bogie frame 12. A lower end of the center pin 21 is connected with a connection seat 22 which is connected to two suspension arms 24 via two first spindles 23, and the suspension arm 24 is of a bending plate body. Lower ends of the two suspension arms 24 are connected to a mounting seat 26 via two second spindles 25, and the mounting seat 26 is connected to the goods loading device integrated spreader 11. In the present embodiment, the goods loading device integrated spreader 11 comprises a main structure 27 made of steel rails, and the mounting seat 26 is welded on the main structure 27. A front portion and a rear portion of the main structure 27 are respectively provided with an energy-absorption anti-collision device 29 so as to prevent an impact on the cargo vehicle bogie 3 and guarantee a security of the cargo vehicle bogie 3 and the working goods loading device 33 in case of emergency. The energy-absorption anti-collision device 29 may also be mounted on an end of the cargo vehicle bogie 3, or anywhere. The present invention is not limited in this regard, and any position where the energy-absorption anti-collision device 29 is mounted falls within the protection scope of the present invention. Safety cables are reserved between the cargo vehicle bogie 3 and the goods loading device 33, so as to guarantee the cargo vehicle 3 working securely, even if the cargo vehicle 3 is accidentally dropped in case of the suspension device 10 being out of work. A power supply system 28 is further included that supplies power to the cargo vehicle bogie 3. The power supply system 28 adopts a super-capacitor supply mode and is connected between the rail system 1 and the main structure 27 of the goods loading device integrated spreader 11.

Embodiments of the present invention provide three structures of a transfer apparatus 32.

Figure 10:
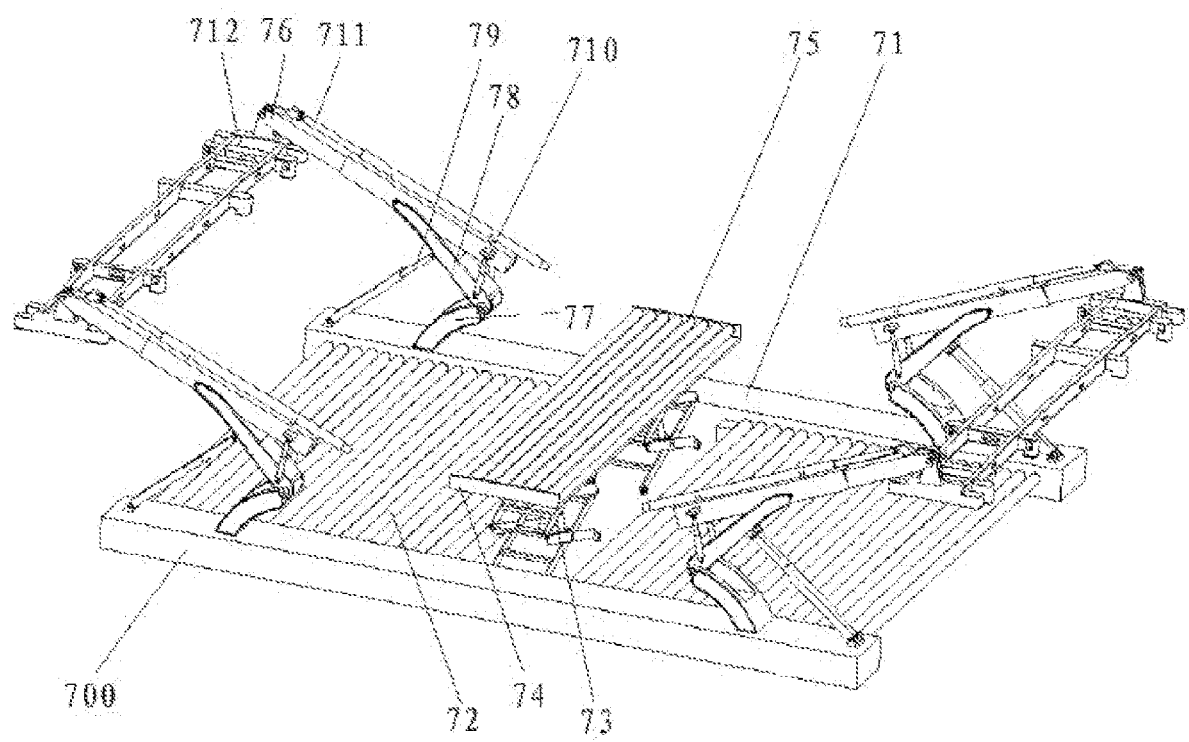
FIG. 10 shows a schematic structural view of a first transfer apparatus in a multimodal transportation interworking system in accordance with embodiments of the present invention.

With reference to FIG. 10, a first transfer apparatus 32 at least comprises a conveyance mechanism, a grab mechanism and a lift mechanism. The grab mechanism places the goods loading device 33 on the conveyance mechanism. The conveyance mechanism transports the goods loading device 33 to the lift mechanism, and the lift mechanism lifts or lowers the goods loading device 33. The goods loading device 33 is loaded onto or unloaded from the cargo vehicle 31. A processor is communicatively connected with the conveyance mechanism, the grab mechanism and the lift mechanism.

A structure of the conveyance mechanism is illustrated. The conveyance mechanism at least comprises a first frame 71, a chain, a first group of rotation shafts 72 and a power outputting device. The first group of rotary shafts 72 is disposed on the first frame 71. Each rotation shaft of the first group of rotation shafts 72 is provided with gears on which the chain is fitted around to drive each rotation shaft of the first group of rotation shafts 72 to rotate, and the power output end of the power outputting device is connected to the chain to drive a rotation of the chain.

In the present embodiment, the power outputting device is an electric motor.

A structure of the lift mechanism is illustrated. The lift mechanism at least comprises a telescopic mechanism 73 and a base, and a telescopic end of the telescopic mechanism 73 is connected to the base.

A structure of the base is illustrated. The base at least comprises a second frame 74 and a second group of rotation shafts 75. A telescopic end of the telescopic mechanism 73 is connected to the second frame 74, and the second group of rotation shafts 75 is disposed on the second frame 74.

The structure of the base is further illustrated. The base further comprises at least a sensing element for sensing whether the goods loading device 33 reaches a predefined position, and the sensing element is disposed on the base. A signal output end of the sending element is connected to a signal input end of the processor.

In the present embodiment, the sensing element comprises a displacement sensor and/or an infrared sensor.

A structure of the grab mechanism is illustrated. The grab mechanism at least comprises a telescopic arm 76, a first support rod 77, a second support rod 78, a first telescopic rod 79, a second telescopic rod 710, a third telescopic rod 711 and a spreader 712. A first end of the first support rod 77 is fixedly connected to the first frame 71, and a second end of the first support rod 77 is hinged to a first end of the second support rod 78. A second end of the second support rod 78 is hinged to the telescopic arm 76. A first end of the first telescopic rod 79 is fixedly connected to the first frame 71, and a second end of the first telescopic rod 79 is hinged to the second support rod 78. A first end of the second telescopic rod 710 is hinged to the first end of the second support rod 78, and a second end of the second telescopic rod 710 is hinged to a first end of the telescopic arm 76. A first end of the third telescopic rod 711 is fixedly connected to the first end of the telescopic arm 76, and a second end of the third telescopic rod 711 is fixedly connected to a second end of the telescopic arm 76. The second end of the telescopic arm 76 is connected to the spreader 712.

In the present embodiment, the first telescopic rod 79, the second telescopic rod 710 and the third telescopic rod 711 may be pneumatic rods or hydraulic rods, and the present embodiment does not limit how the telescopic rod is driven.

Figure 11:
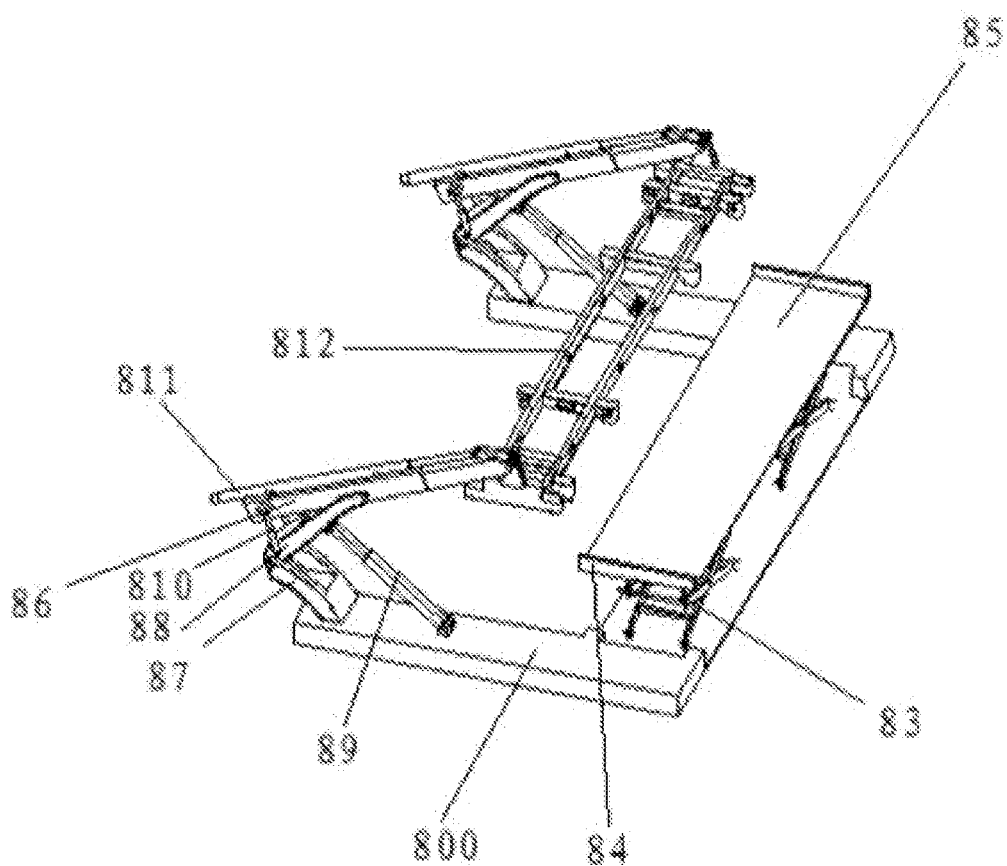
FIG. 11 shows a schematic structural view of a second transfer apparatus in a multimodal transportation interworking system in accordance with embodiments of the present invention.

With reference to FIG. 11, a second transfer apparatus 800 at least comprises a grab mechanism and a lift mechanism. The grab mechanism places the goods loading device on the lift mechanism, and the lift mechanism lifts or lowers the goods loading device. A processor is communicatively connected to the conveyance mechanism, the grab mechanism and the lift mechanism.

A structure of the lift mechanism is illustrated. The lift mechanism at least comprises a telescopic mechanism 83 and a base, and a telescopic end of the telescopic mechanism 83 is connected to the base.

A structure of the base is illustrated. The base at least comprises a frame 84 and a support table 85. A telescopic end of the telescopic mechanism 83 is connected to the frame 84, and the support table 85 is disposed on the frame 84.

The structure of the base is further illustrated. The base further comprises at least a sensing element for sensing whether the goods loading device reaches a predefined position, and the sensing element is disposed on the base. A signal output end of the sensing element is connected to a signal input end of the processor.

In the present embodiment, the sensing element comprises a displacement sensor and/or an infrared sensor.

The structure of the lift mechanism is further illustrated. The lift mechanism further comprises at least: a distance measuring element for sensing an extension amount of the telescopic mechanism 83. The distance measuring element is disposed on the telescopic mechanism 83 and/or the base.

A structure of the grab mechanism is illustrated. The grab mechanism at least comprises a telescopic arm 86, a first support rod 87, a second support rod 88, a first telescopic rod 89, a second telescopic rod 810, a third telescopic rod 811 and a spreader 812. A first end of the first support rod 87 is fixedly connected to the first frame 81, and a second end of the first support rod 87 is hinged to a first end of the second support rod 88. A second end of the second support rod 88 is hinged to the telescopic arm 86. A first end of the first telescopic rod 89 is fixedly connected to the first frame 81, and a second end of the first telescopic rod 89 is hinged to the second support rod 88. A first end of the second telescopic rod 810 is hinged to the first end of the second support rod 88, and a second end of the second telescopic rod 810 is hinged to a first end of the telescopic arm 86. A first end of the third telescopic rod 811 is fixedly connected to the first end of the telescopic arm 86, and a second end of the third telescopic rod 811 is fixedly connected to a second end of the telescopic arm 86. The second end of the telescopic arm 86 is connected to the spreader 812.

In the present embodiment, the first telescopic rod 89, the second telescopic rod 810 and the third telescopic rod 811 may be pneumatic rods or hydraulic rods, and the present embodiment of the invention does not limit how the telescopic rod is driven.

To achieve an automation functionality of embodiments of the present invention, at least a controller is further provided. A signal input end of the controller is communicatively connected to signal output ends of the sensing element and the distance measuring element, and a signal output end of the controller is communicatively connected to signal input ends of the telescopic mechanism 83, the first telescopic rod 89, the second telescopic rod 810, the third telescopic rod 811 and the spreader 812. The controller controls the telescopic mechanism 83, the first telescopic rod 89, the second telescopic rod 810, the third telescopic rod 811 and the spreader 812 to work as required.

Figure 12:
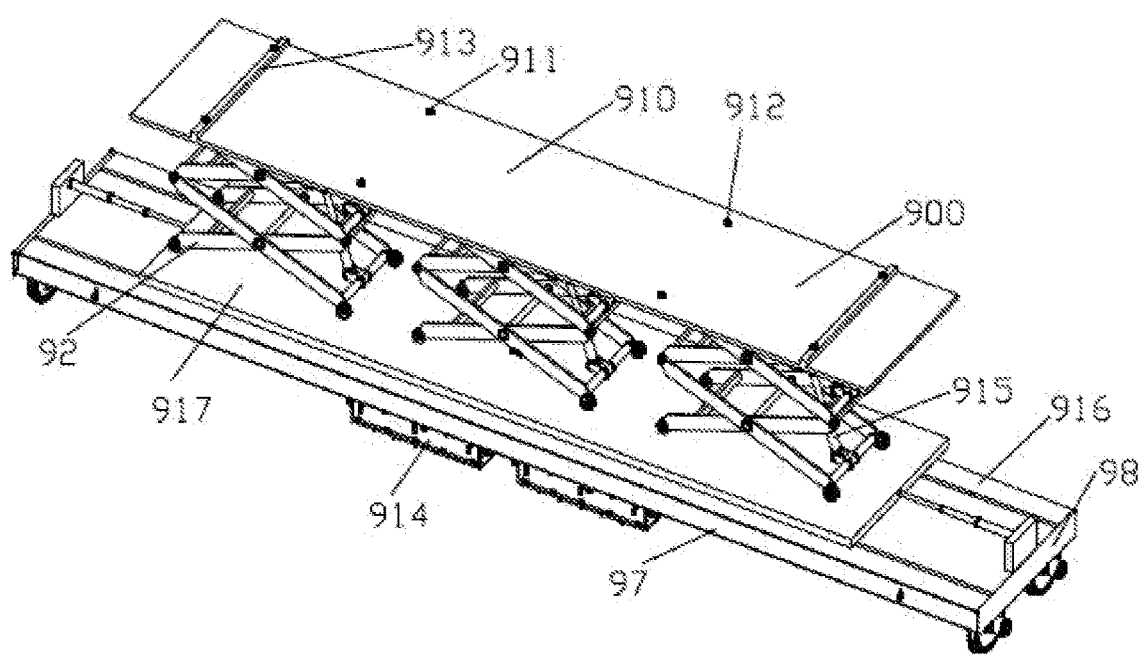
FIG. 12 shows a schematic structural view of a third transfer apparatus in a multimodal transportation interworking system in accordance with embodiments of the present invention.
Figure 13:
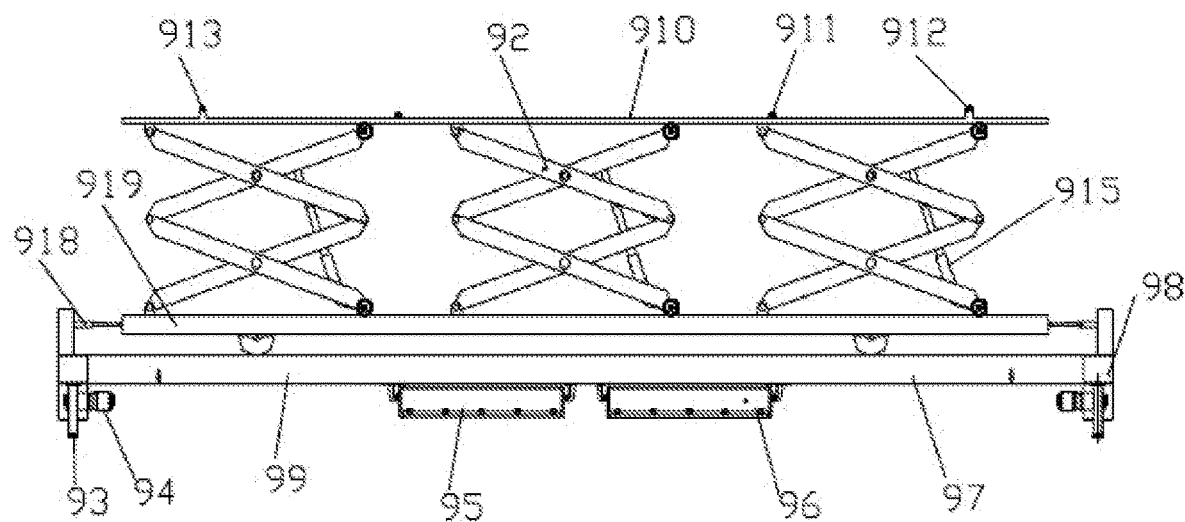
FIG. 13 shows a front view of a third transfer apparatus in a multimodal transportation interworking system in accordance with embodiments of the present invention.

With reference to FIGS. 12 and 13, a third transfer apparatus comprises an underframe 99, a lifting device 92, a lifting table 910, a lifting driving device 914, multiple travel wheels 93, a travel driving device 94, and a translation device 917.

The lifting device 92 is connected between the underframe 99 and the lifting table 910;

the lift driving device 914 is connected to the lifting device 92, for driving the lifting device 92 to lift or lower the lifting table;

the multiple travel wheels 93 are fixed under the underframe 99;

the travel driving device 94 is fixed onto the underframe 99 and connected to the travel wheels 93 for driving a rotation of the travel wheels 93;

the processor is communicatively connected to the lift driving device 914 and the travel driving device 94.

In the present embodiment, a surface of the lifting table 910 which is opposite to the lifting device 92 is provided with a first group of locks 911 and a second group of locks 912 which are snap-fasten to a bottom of the goods loading device 33. The second group of locks is located external to the first group of locks 911 and has a higher height than the first group of locks 911. Two ends of the surface of the lifting table 910 which is opposite to the lifting device 92 are provided with two protruding beams 913, and the second group of locks 912 is disposed on the two protruding beams 913. The first group of locks 911 and the second group of locks 912 consist of four embosses, respectively.

A structure of the underframe 99 is illustrated. The underframe 99 comprises at least two end beams 98, at least two side beams 97, a plurality of crossbeams and a bottom plate 916. Two ends of the at least two end beams 98 are connected to two ends of the at least two side beams 97, respectively. The plurality of crossbeams are disposed between the at least two end beams 98, and two ends thereof are connected to the at least two side beams 97, respectively. The bottom plate 916 is fixed onto the at least two end beams 98, the at least two side beams 97 and the plurality of crossbeams. In other embodiments, the bottom plate 916 may not be provided. Further, in the present embodiment, a travelling direction of the multiple travel wheels 93 is parallel to a length direction of the end beams 98.

The travel wheel 93 may be provided as a rubber wheel or a universal wheel, and a kinetic energy of the transfer device may be provided by a super capacitor, and a quick charging pile may be arranged at a start position or a specified position.

To achieve an alarm functionality, embodiments of the present invention at least may further comprise an alarm apparatus, and a signal input end of the alarm apparatus is communicatively connected to a signal output end of the processor.

A goods loading device transfer operation procedure for transporting a goods loading device 33 from a port goods loading device dock to a railway, road or air logistics center and other goods loading device logistics center according to embodiments of the present invention is as below:

(1) a grab mechanism of a transfer apparatus 32 at a shipment place receives a C0001# goods loading device 33 (it is assumed that the goods loading device 33 is numbered as C0001#) from a dockside loading and unloading crane at a port goods loading device dock, and the C0001# goods loading device 33 is transported by a conveyance mechanism of the transfer apparatus 32 to a loading & unloading place for goods loading devices where a cargo vehicle stops within a short distance, and then a lift mechanism of the transfer apparatus 32 lifts the C0001# goods loading device 33 to an appropriate height;

(2) the cargo vehicle 31 on the rail system 30 is controlled by a processor to run to the loading & unloading place, and a spreader 29 of the cargo vehicle 31 is utilized to grab the C0001# goods loading device 33 and automatically transport the same along the rail beam to a specified unloading place for goods loading devices in a multimodal transport logistics center;

(3) the C0001# goods loading device 33 is received from the cargo vehicle 31 by the lift mechanism of the transfer apparatus 32 at the unloading place and transferred by the conveyance mechanism and the grab mechanism of the transfer apparatus 32 to a road container truck or a railway goods loading device transport vehicle which stops at the unloading place in advance. At this point, the procedure for transporting the C0001# goods loading device 33 from the port to the multimodal transport logistics center according to embodiments of the present invention ends.

By means of embodiments of the present invention, a goods loading device 33 may also be transported from a railway, road or air goods loading device logistics center to a port goods loading device dock, a specific operation procedure of which is in a reverse order with respect to the foregoing operation procedure and thereby is not illustrated here.

Technical Effects

By a rail system 30 connecting various ports with railway and air logistics centers, and a processor controlling a transfer apparatus 32 to transfer a goods loading device 33 and controlling a cargo vehicle 31 to move on the rail system 30 after the goods loading device 33 is secured onto the cargo vehicle 31, a multimodal transport between ports and railway, air logistics centers is achieved. In addition, by replacing road goods loading device transport trucks with the rail system, not only a transportation efficiency is increased, but also a pressure on the ground transportation is reduced and the environment is also protected.

By means of a sky rail system 30 according to embodiments of the present invention, interconnecting and interworking between various goods loading device distribution centers may be achieved, and harmonious connection between rail, water, road and air logistics systems is realized, completely meeting "zero-distance transfer and seamless connection" requirements, and sufficiently releasing the ground transportation capacity. Embodiments of the present invention completely conform to the national strategy on vigorous development of multimodal transport and provide an overall solution for intelligent and efficient transfer of goods loading device multimodal transport.

While the preferred embodiments of the present invention have been described, those skilled in the art may make other alterations and modifications to these embodiments once learning the basic creative concept. Therefore, the claims as appended are intended to be construed as including the preferred embodiments and all alterations and modifications which fall within the scope of the present invention.

It is obvious that those skilled in the art may make various changes and variations to the present invention without departing from the spirit and scope of the present invention. Thereby, if these changes and variations to the present invention belong to the scope of the claims of the present invention and equivalent technology, the present invention is also intended to cover these changes and variations.

The invention claimed is:

1. A multimodal transportation interworking system, at least comprising:
   a rail system;
   a cargo vehicle movably disposed on a rail beam of the rail system;
   a transfer apparatus used for transferring a goods loading device from a transportation tool to the cargo vehicle and loading the goods loading device onto the cargo vehicle, or unloading the goods loading device from the cargo vehicle and conveying the goods loading device onto the transportation tool;
   a processor connected to the cargo vehicle and the transfer apparatus so as to control the transfer apparatus to transfer the goods loading device, and to control the cargo vehicle to move on the rail beam after the goods loading device is secured onto the cargo vehicle;
   wherein, as the goods loading device needs to be transferred, the transfer apparatus transfers the goods loading device from the transportation tool to the cargo vehicle and loads the goods loading device onto the cargo vehicle, and the processor controls the cargo vehicle to move on the rail beam, or the transfer apparatus unloads the goods loading device from the cargo vehicle and conveys the goods loading device onto the transportation tool; and
   wherein the cargo vehicle comprises a cargo vehicle bogie, the cargo vehicle bogie comprising a bogie frame whose front and rear ends are connected with gearboxes respectively, each of the gearboxes being symmetrically provided with two output shafts on left and right sides, a travelling wheel being mounted on each of the output shafts, the cargo vehicle bogie running on the rail beams by four travelling wheels, front and rear ends of two gearboxes being connected to two frame intermediate connections respectively, front and rear ends of the two frame intermediate connections being respectively connected to two traction electric motors which control the cargo vehicle bogie to run.

2. The system of claim 1, wherein the rail system is bilaterally symmetrically mounted with two rail beams, the two rail beams being respectively provided with a plurality of cargo vehicles which are movable thereon, the goods loading device being suspended on a lower end of the plurality of cargo vehicles below the rail beam at each side.

3. The system of claim 2, wherein the rail beams are of a box-type structure, a lower surface of the rail beams being provided with an opening which extends through from a front end to a rear end thereof, the cargo vehicle being supported at a lower surface of an inner cavity of the rail beams.

4. The system of claim 3, wherein each of the cargo vehicles comprises a cargo vehicle bogie being supported at the lower surface of the inner cavity of the rail beams, a lower end of the cargo vehicle bogie being connected to a goods loading device integrated spreader via a suspension device after passing through the opening, a lower end of the goods loading device integrated spreader being connected to the goods loading device; the processor is connected to the traction electric motor.

5. The system of claim 4, wherein a left side and a right side of a housing of each of the traction electric motors are symmetrically connected with two guide wheel mounting seats on a lower portion thereof, guide wheels being mounted on the two guide wheel mounting seats respectively, guide rails being provided on left and right side walls of the opening of the rail beams respectively, the two guide wheels moving along the two guide rails respectively.

6. The system of claim 5, wherein the suspension device comprises a center pin, an upper end of the center pin being connected to a lower end of the bogie frame, a lower end of the center pin being connected with a connection seat which is connected to two suspension arms via multiple first spindles, lower ends of the two suspension arms being connected to a mounting seat via multiple second spindles, the mounting seat being connected to the goods loading device integrated spreader.

7. The system of claim 1, wherein the transfer apparatus at least comprises: a conveyance mechanism, a grab mechanism and a lift mechanism; the grab mechanism places the goods loading device on the conveyance mechanism; the conveyance mechanism transports the goods loading device to the lift mechanism; the lift mechanism lifts or lowers the goods loading device; the goods loading device is loaded onto or unloaded from the cargo vehicle; the processor is communicatively connected to the conveyance mechanism, the grab mechanism and the lift mechanism.

8. The system of claim 7, wherein the conveyance mechanism at least comprises: a first frame, a chain, a first group of rotation shafts and a power outputting device; the first group of rotation shafts is disposed on the first frame; each rotation shaft of the first group of rotation shafts is provided with gears; the chain is fitted around the gears to drive each rotation shaft of the first group of rotation shafts to rotate; a power output end of the power outputting device is connected to the chain.

9. The system of claim 7, wherein the grab mechanism at least comprises: a telescopic arm, a first support rod, a second support rod, a first telescopic rod, a second telescopic rod, a third telescopic rod and a spreader; a first end of the first support rod is fixedly connected to the first frame, and a second end of the first support rod is hinged to a first end of the second support rod; a second end of the second support rod is hinged to the telescopic arm; a first end of the first telescopic rod is fixedly connected to the first frame, and a second end of the first telescopic rod is hinged to the second support rod; a first end of the second telescopic rod is hinged to the first end of the second support rod, and a second end of the second telescopic rod is hinged to a first end of the telescopic arm; a first end of the third telescopic rod is fixedly connected to the first end of the telescopic arm, and a second end of the third telescopic rod is fixedly connected to a second end of the telescopic arm; the second end of the telescopic arm is connected to the spreader.

10. The system of claim 1, wherein the transfer apparatus comprises: an underframe, a lifting device, a lifting table, a lift driving device, a plurality of travel wheels and a travel driving device;
   the lifting device is connected between the underframe and the lifting table;
   the lift driving device is connected to the lifting device for driving the lifting device to lift or lower the lifting table;

the plurality of travel wheels are fixed under the underframe;

the travel driving device is fixed onto the underframe and connected to the travel wheels for driving a rotation of the travel wheels;

the processor is communicatively connected to the lift driving device and the travel driving device.

\* \* \* \* \*